United States Patent
Matoba et al.

(10) Patent No.: US 7,366,737 B2
(45) Date of Patent: Apr. 29, 2008

(54) STORAGE COMPONENT AND STORAGE SYSTEM

(75) Inventors: Hiroshi Matoba, Tokyo (JP); Takao Oomachi, Tokyo (JP); Johji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 592 days.

(21) Appl. No.: 10/801,037

(22) Filed: Mar. 16, 2004

(65) Prior Publication Data

US 2004/0205232 A1    Oct. 14, 2004

(30) Foreign Application Priority Data

Mar. 20, 2003    (JP) ............................. 2003-077757

(51) Int. Cl.
*G06F 12/00*    (2006.01)
(52) U.S. Cl. ...................... 707/200; 707/201; 711/148; 711/156
(58) Field of Classification Search ................ 707/201, 707/200; 711/148, 156
See application file for complete search history.

(56) References Cited

U.S. PATENT DOCUMENTS

| 5,193,171 | A  | * | 3/1993 | Shinmura et al. | ........... | 711/113 |
| 2002/0023156 | A1 | * | 2/2002 | Chujo et al. | ................ | 709/226 |
| 2002/0152181 | A1 | * | 10/2002 | Kanai et al. | .................. | 705/80 |

FOREIGN PATENT DOCUMENTS

| JP | 61-122762 | 6/1986 |
| JP | 3-180941 | 8/1991 |
| JP | 4-199323 | 7/1992 |
| JP | 2000-235546 | 8/2000 |
| JP | 2001-313891 | 11/2001 |
| JP | 2001-325457 | 11/2001 |
| JP | 2002-63052 | 2/2002 |
| JP | 2002-207629 | 7/2002 |
| JP | 2002-312225 | 10/2002 |
| JP | 2003-58408 | 2/2003 |
| JP | 2003-63052 | 3/2003 |

* cited by examiner

*Primary Examiner*—Don Wong
*Assistant Examiner*—Angela M Lie
(74) *Attorney, Agent, or Firm*—Young & Thompson

(57) ABSTRACT

A storage component interconnected via a network includes a recording unit for recording various contents, a first management table, a second management table and a control unit. The first management table manages for each user storage capacity in use by users in each recording unit of the storage components on the network. The second management table manages for each user total storage capacity that each user is allowed to use in all the recording units of the storage components on the network. The control unit restricts the storage capacity in use by the users so that the storage capacity used by the user does not exceed the total storage capacity that the user is allowed to use, on the basis of the first management table and the second management table.

20 Claims, 3 Drawing Sheets

DEVICE NAME : STORAGE DEVICE $1_1$

| | (A) STORAGE CAPACITY | (B) STORAGE CAPACITY IN USE OF EACH USER | | | | | (C) DATA UPDATE TIME |
|---|---|---|---|---|---|---|---|
| | | USER A | USER B | USER C | ... | USER X | |
| STORAGE COMPONENT $1_1$ | 200G | 34M | 33M | 21G | | 12M | 02/03/21 13:23:32 |
| STORAGE COMPONENT $1_2$ | 500G | 300M | 0M | 10M | | 123G | 02/03/11 13:23:32 |
| STORAGE COMPONENT $1_3$ | 300G | 20M | 33M | 90G | | 12M | 02/02/21 13:23:32 |
| STORAGE COMPONENT $1_4$ | 200G | 50M | 33M | 100M | | 12M | 02/03/20 13:23:32 |
| ... | | | | | | | |
| STORAGE COMPONENT $1_N$ | 500G | 200G | 33M | 21M | | 12M | 02/03/21 13:03:32 |

DEVICE NAME : STORAGE DEVICE $1_1$

| | (A) STORAGE CAPACITY | (B) STORAGE CAPACITY IN USE OF EACH USER | | | | | (C) DATA UPDATE TIME |
|---|---|---|---|---|---|---|---|
| | | USER A | USER B | USER C | ... | USER X | |
| STORAGE COMPONENT $1_1$ | 200G | 34M | 33M | 21G | | 12M | 02/03/21 13:23:32 |
| STORAGE COMPONENT $1_2$ | 500G | 300M | 0M | 10M | | 123G | 02/03/11 13:23:32 |
| STORAGE COMPONENT $1_3$ | 300G | 20M | 33M | 90G | | 12M | 02/02/21 13:23:32 |
| STORAGE COMPONENT $1_4$ | 200G | 50M | 33M | 100M | | 12M | 02/03/20 13:23:32 |
| ... | | | | | | | |
| STORAGE COMPONENT $1_N$ | 500G | 200G | 33M | 21M | | 12M | 02/03/21 13:03:32 |

Figure 3

|  | (D) USABLE STORAGE CAPACITY | (E) DATA UPDATE TIME |
| --- | --- | --- |
| USER A | 500G | 02/03/21 13:23:32 |
| USER B | 400G | 02/03/31 13:23:32 |
| USER C | 500G | 02/03/21 13:13:32 |
| . . . | | |
| USER X | 450G | 02/03/22 13:23:32 |

Figure 4

STORAGE COMPONENT AND STORAGE SYSTEM

BACKGROUND OF THE INVENTION

1. Field of the Invention

The present invention relates to a storage system and a storage component, for recording various contents of video images, sounds, or the like.

2. Description of Related Art

There has been a storage system in which a plurality of home-oriented storage components are interconnected over a network to allow users to record various contents of video images, sounds, or the like, onto an arbitrary storage component on the network. This type of storage system, since it does not require a server for managing storage components in a unified manner, is referred to as a server-less model and possesses several advantages such that the cost of constructing the system can be reduced.

In the conventional storage system, however, there is no method of restricting storage capacity of each user. Hence when a plurality of users use the storage system, problem arises that certain users fully occupy the storage components on the network and others fail to record contents.

A system to solve the above problem is disclosed. The system is provided on a network with an apparatus for managing in a unified manner, content recording information about contents recorded by users (see Japanese Patent laid-open No 2000-235546, Japanese Patent laid-open No 2001-313891 and Japanese Patent laid-open No 2001-325457, for example).

According to the systems disclosed in the above Patent Documents, a storage component on a network can restrict the storage capacity of each user by referring to the content recording information managed by the described apparatus in a unified manner when users record contents, which is an advantage of this system.

However, in the conventional arts disclosed in the above Patent Documents, an apparatus for managing the content recording information in a unified manner needs to be provided separately from the storage component, and such system is thus not the server-less model, leading to a problem of increase in cost of constructing the system.

SUMMARY OF THE INVENTION

It is an object of the present invention to provide a storage system with a configuration adapted to the server-less model which is capable of restricting storage capacity of each user.

Embodiments within the scope of the present invention may achieve one or more of the above objectives, in whole or in part.

According to one aspect of the present invention, a storage component connected to a network, comprises: a recording unit that records at least one content; a management table that has a first management item for managing, for each user, storage capacity in use by users in each of the recording unit of a plurality of storage components, and a second management item for managing, for each user, total storage capacity that each user is allowed to use in all the recording unit of the plurality of storage components; and a control unit that restricts the storage capacity in use by the users based on the management table so that the storage capacity of the recording unit used by a user does not exceed the total storage capacity that the user is allowed to use.

According to another aspect of the present invention, a storage system having a plurality of storage components interconnected via a network, wherein each storage component comprises: a recording unit that records at least one content; a management table that has a first management item for managing, for each user, storage capacity in use by users in each of the recording unit of the plurality of storage components, and a second management item for managing, for each user, total storage capacity that each user is allowed to use in all the recording unit of the plurality of storage components; and a control unit that restricts the storage capacity in use by the users based on the management table so that the storage capacity of the recording unit used by a user does not exceed the total storage capacity that the user is allowed to use.

BRIEF DESCRIPTION OF THE DRAWINGS

For a better understanding of the invention as well as other objects and features thereof, reference is made to the following detailed description to be read in conjunction with the accompanying drawings, wherein:

FIG. 3 is one example of a first management table shown in FIG. 2; and

FIG. 4 is one example of a second management table shown in FIG. 2.

DETAILED DESCRIPTION OF THE PREFERRED EMBODIMENTS

Figure 1:
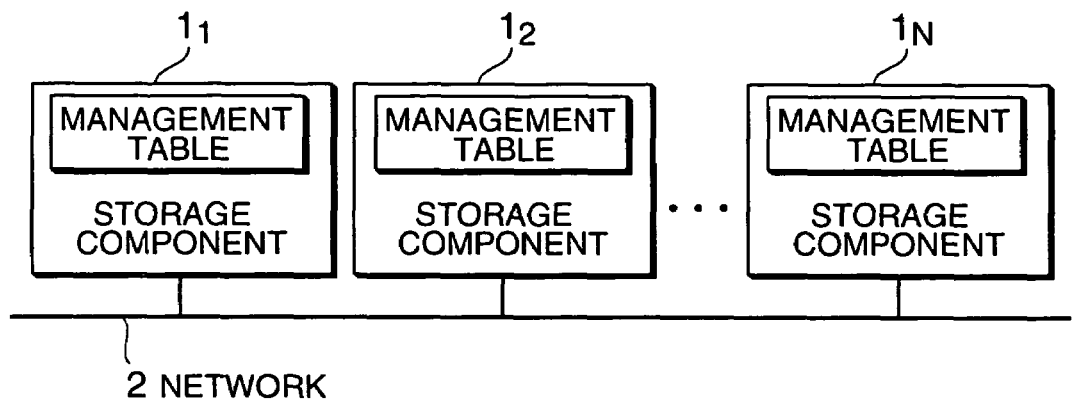
FIG. 1 is a block diagram outlining a configuration of a storage system according to embodiments of the present invention.

Referring to FIG. 1, a storage system according to the one embodiment of the present invention comprises a plurality of storage components $1_1$ to $1_N$ connected to one another via a network 2 such as a home network.

Each of the storage components $1_1$ to $1_N$ includes a management table having a first management item for managing, for each user, storage capacity in use by users in each of the storage components $1_1$ to $1_N$ on the network 2; and a second management item for managing, for each user, the total storage capacity each user is allowed to use in all the storage components $1_1$ to $1_N$ on the network 2, and on the basis of this management table, restricts so that the storage capacity used by a user does not exceed the total storage capacity the user is allowed to use.

The management table in each of the storage components $1_1$ to $1_N$ may be a single management table having the first management item and the second management item, or may alternatively be divided to a first management table having the first management item and a second management table having the second management item. This embodiment will be described assuming that the management table of each of the storage components $1_1$ to $1_N$ is divided to the first management table having the first management item and the second management table having the second management item.

Each of the storage components $1_1$ to $1_N$ is a storage unit for home use such as an HDD recorder, or a personal computer, to be provided at user's home, and they are assumed to be connected to one another over a home network such as Ethernet, while a configuration in which each of the storage components $1_1$ to $1_N$ provided in an office is interconnected over an office LAN (Local Area Network), or a configuration in which each of the storage components $1_1$ to $1_N$ provided at different sites is interconnected over the Internet, is also allowable.

Figure 2:
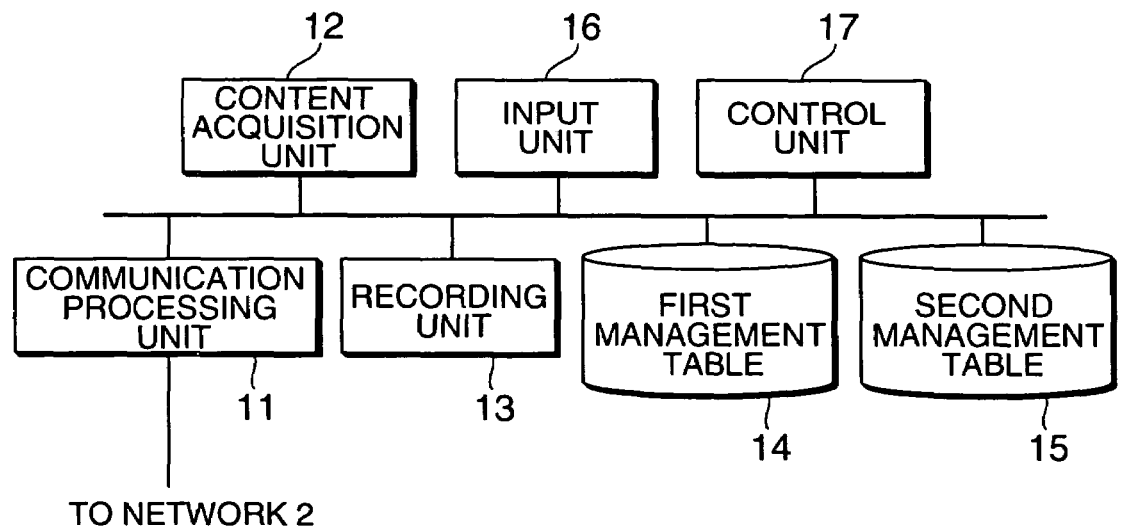
FIG. 2 is a block diagram showing a configuration of a storage component according to embodiments of the present invention.

FIG. 2 is a block diagram showing one embodiment of a configuration of the storage components $1_1$ to $1_N$ shown in FIG. 1.

Referring to FIG. 2, the storage components $1_1$ to $1_N$ each comprises a communication processing unit 11, a content acquisition unit 12, a recording unit 13, the first management table 14, the second management unit 15, an input unit 16, and a control unit 17.

The communication processing unit 11 is an interface for transmitting and receiving packets describing various kinds of information to and from other storage components via the network 2.

The content acquisition unit 12 acquires various contents of video images, sounds, or the like. For example, it acquires program contents of terrestrial broadcasting or BS broadcasting via an antenna which is not shown or via a cable for cable television which is not shown either, and also acquires contents from other storage components connected to the network 2 through the communication processing unit 11.

The recording unit 13 is an HDD and the like, for recording contents acquired by the content acquisition unit 12.

The first management table 14 is, as described above, a table representing, for each user, the storage capacity in use by users in each of the recording units 13 of the storage components $1_1$ to $1_N$ on the network 2. In this first management table 14, the following items A to C are registered for each of the storage components $1_1$ to $1_N$ on the network 2, as shown in FIG. 3.

(A) Storage capacity of the recording unit 13
(B) Storage capacity in use by each user A to X
(C) Time when data of item B was updated The second management table 15 is, as described above, is a table representing, for each user, the total storage capacity each user is allowed to use in all the recording units 13 of the storage components $1_1$ to $1_N$ on the network 2. In this second management table 15, the data of the following items D and E are registered for each user A to X, as shown in FIG. 4, for example.

(D) Total storage capacity of recording units 13 each user A to X is allowed to use
(E) Time when data of item D was updated The input unit 16 is a part used by a user to input various kinds of information or instruction data onto the storage components $1_1$ to $1_N$. Note here that the input unit 16 includes various portions associated with the input to the storage components $1_1$ to $1_N$, such as operation buttons provided to the storage components $1_1$ to $1_N$ themselves and a receiving unit for receiving signals from a remote-controller.

The control unit 17 controls the above each component, and more specifically, performs acquisition, creation, and management of the data of the first management table 14 and second management table 15, restriction on the storage capacity of each user on the basis of the first management table 14 and the second management table 15, and recording of contents onto the recording unit 13.

Operation of the embodiment will be described in detail below.

Creation and management of the first management table 14 will be described.

When receiving, at the input unit 16 of the own storage, an instruction for recording or deleting contents into or from the recording unit 13 of the own or other storage component, the control unit 17 of each storage component 11 to $1_N$ recognizes a user that the recording instruction or deleting instruction is received from.

As a method of having the control unit 17 of each storage component $1_1$ to $1_N$ recognize the user, there are, for example, a method in which each user uses an individual remote-controller for the storage components $1_1$ to $1_N$, a method in which each user presses a relevant user recognition button on a remote-controller for the storage components $1_1$ to $1_N$, a method in which each user inputs an ID/Password to the storage components $1_1$ to $1_N$, a method in which each user inputs his/her fingerprint to the storage components $1_1$ to $1_N$, and a method in which a user using the storage components $1_1$ to $1_N$ is assumed to be a fixed user to have the control unit 17 uniquely recognize the user using the storage components $1_1$ to $1_N$.

When receiving, at the input unit 16 of the own storage component, the instruction from the user for deleting contents from the recording unit 13 of the own or other storage component, the control unit 17 of each storage component $1_1$ to $1_N$ executes deleting processing. For example, when receiving the instruction for deleting contents from the recording unit 13 of the own storage component, the control unit 17 executes the deleting processing and thereafter updates the data of the own storage component among data in the first management table 14 of the own storage component. More specifically, regarding the own storage component among the data of the first management table 14, the storage capacity in use of each user is updated, and that time is also updated as data update time. Whereas, when receiving the instruction for deleting contents from the recording unit 13 of another storage component, the control unit 17 transmits packets describing the user's instruction to another storage component concerned via the network 2 to prompt it to execute the deleting processing.

Meanwhile, when receiving, at the input unit 16 of the own storage component, the instruction for recording new contents onto the recording unit 13 of the own or other storage component, the control unit 17 of each storage component 11 to $1_N$ determines based on the first management table 14 and the second management table 15 whether the storage capacity of the recording unit 13 used by the user exceeds the total storage capacity the user is allowed to use, as a result of recording the new contents, and only when it determines not to exceed, the control unit 17 executes the recording processing. For example, when receiving the instruction from the user for recording contents onto the recording unit 13 of the own storage component, the control unit 17 executes the recording processing and thereafter updates the data of the own storage component among the data in the first management table 14 of the own storage component. More specifically, regarding the own storage component among the data in the first management table 14, data of the storage capacity in use of each user is updated, and that time is also updated as the data update time. When receiving the instruction of recording contents onto the recording unit 13 of another storage component, the control unit 17 transmits the packets describing the user's instruction to another storage component concerned via the network 2 to prompt it to execute the recording processing.

The control unit 17 of each storage component $1_1$ to $1_N$ transmits the packets describing the data in the first management table 14 of the own storage component, periodically and/or at predetermined timing (when the own storage component is activated or when the data of the first management table 14 is changed according to the change in the use status of the recording unit 13), by broadcasting into the network 2 or to multicast group addresses on the network 2 which are common to the storage components $1_1$ to $1_N$.

The information transmitted herein includes <1> data for identifying the own storage component (computer name or IP address), <2> data of the storage capacity in use of each user, and <3> data of the data update time of <2>. At this time, among the data of the first management table 14, only the data of the own storage component may be transmitted, or alternatively data of all the storage components registered in the first management table 14 may be transmitted.

The control unit 17 of each storage component $1_1$ to $1_N$ updates, on the basis of the data in the first management table 14 of another storage component which is described in the packets received from another storage component concerned, data of the other storage component among the data in the own first management table 14.

For example, when only the data of the other storage component among data in the first management table 14 of the other storage component concerned is transmitted, the control unit 17 of each storage component $1_1$ to $1_N$ carries out the following processing.

When a new user who is not found in the own first management table 14 is registered in the data of the first management table 14 of other storage component, the control unit 17 of each storage component $1_1$ to $1_N$ adds data of the storage capacity in use by the new user to the own first management table 14. When data of a user registered in the own first management table 14 is not found in the data of the first management table 14 of other storage component, the control unit 17 of each storage component $1_1$ to $1_N$ deletes the data of the storage capacity in use by the user from the own first management table 14. When receiving packets from a storage component that is not registered in the own first management table 14, the control unit 17 adds data of the storage capacity in use of each user using the storage component to the own first management table 14. Also the control unit 17 recognizes the time of receiving the packets from the storage component as the data update time in relation to data of the other storage component, and updates the own first management table 14.

On the other hand, when the data of all the storage components registered in the first management table 14 of another storage component is transmitted, the control unit 17 of each storage component $1_1$ to $1_N$ carries out the following processing.

The control unit 17 of each storage component $1_1$ to $1_N$ compares the first management table 14 of the own storage component with the first management table 14 transmitted from another storage component and specifies, among storage components (except for the own storage component) registered in the first management table 14 of the own storage component, a storage component having more latest data update time than the own storage component has. When a new user who is not found in the own first management table 14 is registered in the data of the first management table 14 of the specified storage component, the control unit 17 adds data of the storage capacity in use by the user to the own first management table 14. Furthermore, when user data represented in the own first management table 14 does not exist in the data of the first management table 14 of the specified storage component, the control unit 17 deletes the data of the storage capacity in use by the user from the own first management table 14. When the packets are received from a storage component that is not registered in the own first management table 14 or when a new storage component that is not registered in the own first management table 14 exists in the first management table 14 of other storage component, the control unit 17 adds data of the storage capacity in use of each user using the storage component to the own first management table 14. The control unit 17 also recognizes the time at which the data of the storage capacity in use of each user is actually updated, as the data update time of the data, and then updates the own first management table 14.

Furthermore, to cope with a storage component connected to the network 2 with its power being in an OFF-state (where the plug is not removed from a receptacle), the power can be brought into an ON-state remotely over the network 2. A method of transmitting WOL (Wake On LAN) packets to a target storage component over the network 2, or the like, is given, for example. Specifically, control unit 17 of each storage component $1_1$ to $1_N$ carries out the following processing.

The control unit 17 of each storage component $1_1$ to $1_N$ periodically checks the data update time of other storage components in the own first management table 14.

When there is a storage component that a predetermined period of time has elapsed from the data update time, the control unit 17 of each storage component $1_1$ to $1_N$ transmits WOL packets to the storage component via the network 2 in order to turn ON the power of the storage component. Each storage component $1_1$ to $1_N$ repeats this transmission of the WOL packets a predetermined number of times so that they can certainly reach the storage component.

When the storage component which is a destination of the WOL packets is being connected to the network 2 and its power is in an OFF-state (where the plug is not removed from a receptacle), the storage component goes into a power ON-state by the WOL packets, therefore it subsequently becomes possible to receive the packets describing the data of the first management table 14 of the storage component.

On the contrary, when there is a storage component from which the packet describing the data of the first management table 14 cannot be received even after the predetermined period of time has elapsed from the WOL packet transmission, the control unit 17 of each storage component $1_1$ to $1_N$ determines that the storage component is separated from the network 2 and thus deletes the data of the storage component from the own first management table 14.

The above-described procedures allow each of the storage components $1_1$ to $1_N$ to update the data of the own first management table 14 to the latest one and to substantially the same data among the storage components $1_1$ to $1^N$.

Creating/updating process of the second management table 15 will be described.

When receiving, at the input unit 16 of the own storage component, an instruction for registering the total storage capacity that a user is allowed to use, the control unit 17 of each storage component $1_1$ to $1_N$ determines whether to admit the registration of the user, and only when it admits, makes the user select the total storage capacity usable by the user within an extent not exceeding a recommended default value.

At this time, the control unit 17 of each storage component $1_1$ to $1_N$ may estimate the upper limit number of users who can utilize this storage system to admit the user registration only when the upper limit number of users is not exceeded, where the total storage capacity of all the recording units 13 on the network 2 may be divided by the upper limit number of users to set the divided storage capacity to the recommended default value. Or alternatively all users registrations may be admitted, and of usable storage capacity that is not allocated to any user at this point, the storage capacity usable by users maybe registered within an extent not exceeding the recommended default value. Note that in the latter case, there is a possibility that the storage capacity allocatable to a user is 0 at that point. In this case, whenever available capacity is generated, the user may be given a priority in the allocation of the available capacity, and afterwards this processing may be continued until the storage capacity allocated to the user reaches the user's requesting capacity.

After admitting the registration of the user and making the user select the total storage capacity that the user is allowed to use in all the recording units 13 on the network 2, the control unit 17 of each storage component $1_1$ to $1_N$ recognizes the selected storage capacity as the total storage capacity usable by the user to thereby update the second management table 15, and then also recognizes that day and time as the data update time to thereby update the second management table 15.

Upon receipt of an instruction for changing the total storage capacity that a user is allowed to use at the input unit 16 of the own storage component, the control unit 17 of each storage component $1_1$ to $1_N$ makes the user select the total storage capacity usable by the user within an extent not exceeding the recommended default value, and recognizes the selected storage capacity as the total storage capacity usable by the user to thereby update the second management table 15, and also recognizes that day and time as the data update time to thereby update the second management table 15.

Furthermore, upon receipt of an instruction for deleting the total storage capacity that a user is allowed to use at the input unit 16 of the own storage component, the control unit 17 of each storage $1_1$ to $1_N$ deletes the user's data (the total storage capacity usable by the user and the data of update time data) from the second management table 15. In this case, it is also allowable that the user's data cannot be deleted from the second management table 15 until the storage capacity used by the user becomes all 0, or alternatively that the user's data can be deleted from the second management table 15 even when the storage capacity used by the user still remains. In the latter case, the remaining storage capacity may be considered to be subjected to immediate deletion or overwriting for effective use thereof, or may be maintained as it is.

The control unit 17 of each storage component $1_1$ to $1_N$ may not allocate the total storage capacity of all the recording units 13 on the network 2 as the total storage capacity usable by each user so that a part of the total storage capacity of all the recording units 13 may remain unoccupied. For example, when a user wishes to record program contents right away immediately before a start of broadcasting or during the broadcasting, the above unoccupied part of the storage capacity is to be allocated, making it possible to cope flexibly with various situations.

The control unit 17 of each storage component $1_1$ to $1_N$ transmits packets describing data of the own second management table 15, periodically and/or at predetermined timing (when the own storage component is activated or when the data of the second management table is changed), by broadcasting into the network 2 or to multicast grope addresses on the network 2 which are common to the storage components $1_1$ to $1_N$.

The data transmitted herein includes <1> data for identifying the own storage component (computer name or IP address), <2> data of the storage capacity that each user is allowed to use, and <3> data of the data update time of <2>.

The control unit 17 of each storage component $1_1$ to $1_N$ updates, on the basis of the data in the second management table 15 of another storage component which is described in the packets received from another storage component concerned, data of a user whose usable total storage capacity is registered, modified, or deleted in other storage components, among the data of own second management table 15.

For example, the control unit 17 of each storage component specifies, among users registered in the own second management table 15, a user having more latest data update time compared to the second management table 15 of another storage component, and then updates data of the total storage capacity the specified user is allowed to use in the data of the own second management table 15 to the data in the second management table 15 of the other storage component. When a new user who is not found in the own second management table 15 is registered in the data of the second management table 15 of other storage component, the control unit 17 adds the data of the storage capacity that the user is allowed to use to the own second management table 15. The control unit 17 also recognizes the time at which the data of the storage capacity the user is allowed to use is actually updated as the data update time for the user's data to thereby update the own second management table 15.

The above-described procedures allow each storage component $1_1$ to $1_N$ to update the data in the own second management table 15 to the latest one and to substantially the same data among the storage components $1_1$ to $1_N$.

In the embodiments, the processing in the storage components $1_1$ to $1_N$ is realized by the above-described dedicated hardware. In addition to that, a program for realizing this function may be recorded in a recording medium that is readable by each of the storage components $1_1$ to $1_N$ to thereby make them read the program recorded in this recording medium, and the processing may be consequently executed. The recording medium readable by each of the storage components $1_1$ to $1_N$ refers to a floppy disk, a magneto-optical disk, a transferable recording medium such as a CD-ROM, as well as the recording unit 13 such as an HDD built in each of the storage components $1_1$ to $1_N$. Furthermore, the recording medium readable by each of the storage components $1_1$ to $1_N$ includes those for dynamically storing a program for a short period of time in such a case as a program is transmitted via the network 2 (transmission medium or transmission wave), or those for storing a program for a predetermined period of time such as volatile memory inside each of the storage components $1_1$ to $1_N$ that serves as a server on that case.

According to the aforementioned embodiments, the user is restricted on the storage capacity even in the case of using any storage component on the network 2, thus offering an advantage that contents can be recorded onto an arbitrary storage component on the network under the circumstance where the storage capacity is restricted.

Moreover, a server for managing a plurality of storage components in a unified manner does not need to be provided, therefore a system can be adapted to a configuration in the server-less model, providing an advantage of reducing the cost of constructing the system.

Although the invention has been described in connection with preferred embodiments thereof, it is to be understood that those embodiments are set forth solely to aid in understanding the invention, and should not be read in a sense to limit the scope of the invention. Modifications of the techniques described herein will be apparent to the skilled artisan when practicing the invention, and such modifications are to be construed as falling within the scope of the appended claims.

What is claimed is:

1. A first storage component connected to at least one second storage component via a network, said first storage component comprising:
   a first recording unit that records at least one content;
   a first control unit associated with said first recording unit, said first control unit generating first data representing storage capacity in use by each user of said first recording unit;
   a management table that has a first management item and a second management item, said management table of said first storage component being separate from a corresponding management table of said second storage component,
   said first management item comprising i) a first data generated by said first control unit regarding the storage capacity in use by each user of said first recording unit, and ii) a second data generated by a second control unit of said second storage component regarding storage capacity in use by each user of a second recording unit of said second storage component, wherein the first and second storage components are physically independent storage devices that are connected via the network,
   said second management item for managing, for each user, total storage capacity that each user is allowed to use in said first and second recording units of said first and second storage components; and
   an interface for receiving said second data from said second storage component and registering said received second data in said management table of said first storage component,
   wherein, said first control unit restricts the storage capacity in use by the users based on said management table of said first storage component so that the storage capacity of said first and second recording units used by a user does not exceed the total storage capacity that the user is allowed to use as registered by said second management item.

2. The first storage component as claimed in claim 1, wherein said first control unit acquires data of said management table of said first storage component independently from said second storage component, and updates the data of said management table of said first storage component based on the acquired data.

3. The first storage component as claimed in claim 2, wherein when a use status of said first recording unit of said first storage component is changed in accordance with recording or deletion of contents, said first control unit updates data of said first storage component among data of said first management item in said management table of said first storage component.

4. The first storage component as claimed in claim 3, wherein said first control unit
   i) transmits, at least one of periodically and at predetermined timing, packets describing the data of said first management item in said management table of said first storage component to other storage components via said network, and
   ii) updates, in accordance with data of said first management item in said management table of said second storage component that is described in packets received from said second storage component via said network, data of said second storage component among the data of said first management item in said management table of said first storage component.

5. The first storage component as claimed in claim 4, wherein said first control unit transmits, among the data of the first management item in said management table of said first storage component, packets describing only the data of said first storage component, to the other storage components via said network.

6. The first storage component as claimed in claim 4, wherein said first control unit transmits, among the data of said first management item in said management table of said first storage component, packets describing data of all the storage components registered in the first management item, to the other storage components via said network.

7. The first storage component as claimed in claim 4, wherein when the packets describing the data of said first management item in said management table of said second storage component are not received from said second storage component for a predetermined period of time, said first control unit transmits packets for turning ON a power of said second storage component thereto via said network.

8. The first storage component as claimed in claim 7, wherein when the packets describing the data of the first management item in the management table of said second storage component are not received from said second storage component for a predetermined period of time after said first control unit transmits the packets for turning ON the power of said second storage component thereto via said network, the first control unit deletes the data of said second storage component from said first management item in said management table of said first storage component.

9. The first storage component as claimed in claim 2, wherein when at least one of registration, modification and deletion of the total storage capacity a user is allowed to use is performed, said first control unit updates data of the user among data of said second management item in said management table of said first storage component.

10. The first storage component as claimed in claim 9, wherein when at least one of registration and modification of the total storage capacity a user is allowed to use is performed at said first storage component, said first control unit makes the user select the total storage capacity the user is allowed to use within an extent not exceeding a recommended default value.

11. The first storage component as claimed in claim 9, wherein said first control unit does not allocate the total storage capacity in all said recording unit of said plurality of storage components as the total storage capacity each user is allowed to use so that a part of the total storage capacity in all said recording unit remains unoccupied.

12. The first storage component as claimed in claim 9, wherein said first control unit
   i) transmits, at least one of periodically and at predetermined timing, packets describing the data of said second management item in said management table of said first storage component to the other storage components via said network, and
   ii) updates, in accordance with data of said second management item in said management table of said second storage component that is described in the packets received from said second storage component via said network, data of a user whose total usable storage capacity is registered, modified, or deleted in said second storage component among the data of the second management item in the management table of said first storage component.

13. The first storage component as claimed in claim 1, wherein said management table is divided to a first management table having said first management item and a second management table having said second management item.

14. A storage system, comprising:
a plurality of storage components interconnected via a network,
each storage component connecting to the network and being a storage device physically independent from every other storage component,
each storage component comprising a recording unit that records at least one content, an associated control unit, and a management table, wherein,
a first storage component, of said plural storage components, includes a first recording unit that records the at least one content, a first control unit associated with said first recording unit, said first control unit generating first data representing storage capacity in user by each user of said first recording unit, and a first management table,
a second storage component, of said plural storage components, includes a second recording unit that records the at least one content, a second control unit associated with said second recording unit, said second control unit generating first data representing storage capacity in user by each user of said second recording unit, and a second management table,
said first management table of said first storage component is separate from said second management table of said second storage component,
each of said first and second management tables respectively has a first management item and a second management item,
said first management item of said first storage component comprising i) a first data generated by said first control unit regarding the storage capacity in use by each user of said first recording unit, and ii) a second data generated by said second control unit of said second storage component regarding storage capacity in use by each user of said second recording unit of said second storage component,
said second management item of said first storage component for managing, for each user, total storage capacity that each user is allowed to use in said first and second recording units of said first and second storage components,
said first control unit restricts the storage capacity in use by the users based on said first management table of said first storage component so that the storage capacity of said first and second recording units used by a user does not exceed the total storage capacity that the user is allowed to use as registered by said second management item.

15. The storage system as claimed in claim 14, wherein said first control unit acquires data of said first management table of said first storage component independently from the other storage components, and updates the data of said first management table based on the acquired data.

16. The storage system as claimed in claim 15, wherein when a use status of said first recording unit of said first storage component is changed in accordance with recording or deletion of contents, said first control unit updates data of said first storage component among data of said first management item in said first management table of said first storage component.

17. The storage system as claimed in claim 16, wherein said first control unit
i) transmits, at least one of periodically and at predetermined timing, packets describing the data of said first management item in said first management table of said first storage component to the other storage components via said network, and
ii) updates, in accordance with data of said first management item in said second management table of said second storage component that is described in packets received from said second storage component via said network, data of said second storage component among the data of said first management item in said first management table of said first storage component.

18. The storage system as claimed in claim 17, wherein said first control unit transmits, among the data of the first management item in said first management table of said first storage component, packets describing only the data of said first storage component, to the other storage components via said network.

19. The storage system as claimed in claim 17, wherein said first control unit transmits, among the data of said first management item in said first management table of said first storage component, packets describing data of all the storage components registered in the first management item, to the other storage components via said network.

20. A computer-readable storage medium recording thereon a computer program to be executed by a first storage component being connected to at least a second storage component via a network and recording at least one content, comprising:
means for creating a management table having a first management item and a second management item, wherein each storage component has a separate management table, and each storage component is a physically independent storage device,
said first management item comprising i) a first data generated by said first storage component regarding the storage capacity in use by each user of said first storage component, and ii) a second data generated by said second storage component regarding storage capacity in use by each user of said second storage component,
said second management item for managing, for each user, total storage capacity that each user is allowed to use in said first and second storage components; and
means for restricting the storage capacity in use by the users based on said management table of said first storage component so that the storage capacity of said first and second storage components used by a user does not exceed the total storage capacity that the user is allowed to use.

* * * * *